Aug. 10, 1937.   J. T. RYAN   2,089,432
RESPIRATORY RESISTANCE TESTING MACHINE
Filed Sept. 23, 1935   3 Sheets-Sheet 1
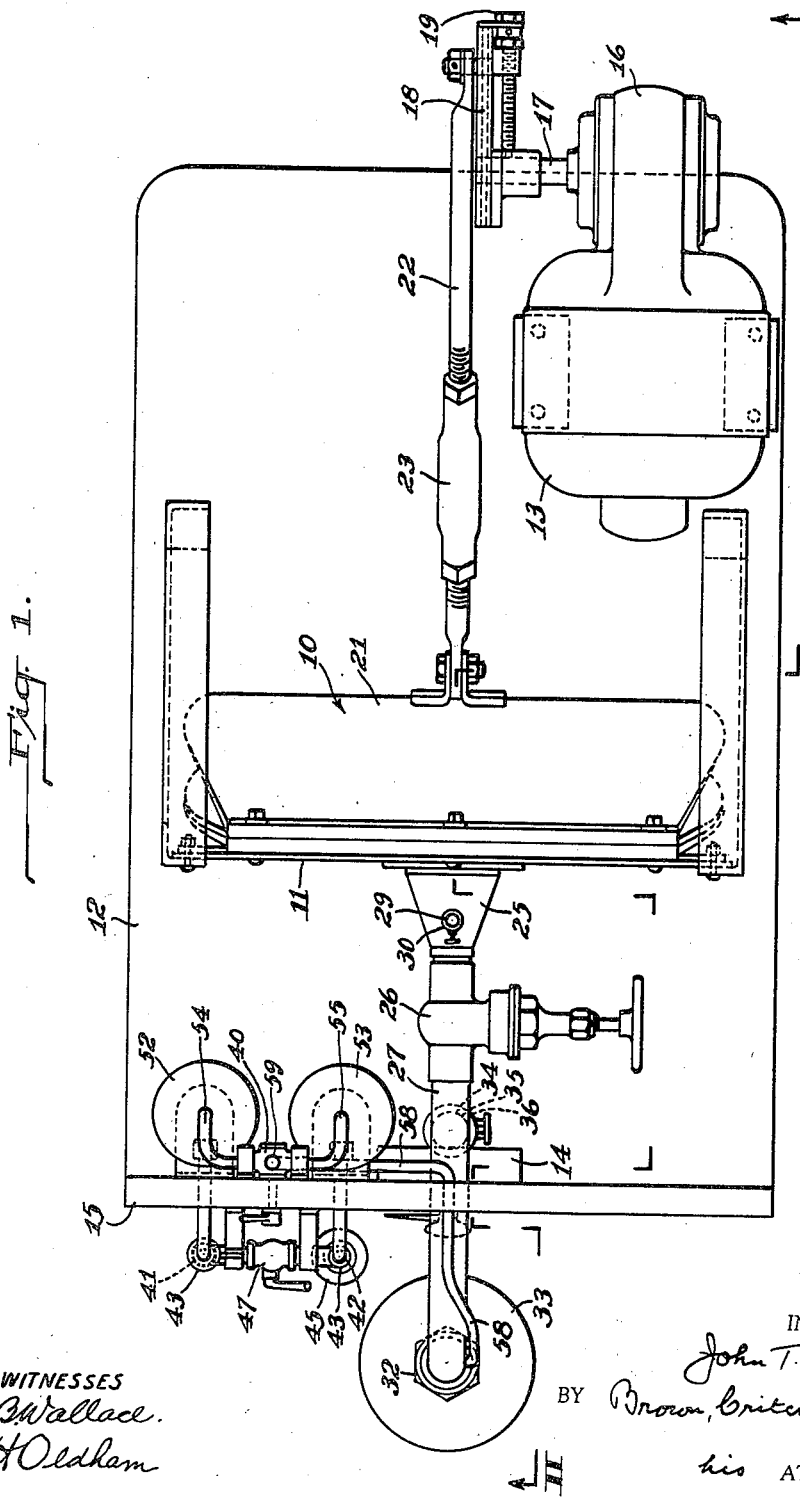
WITNESSES
A B Wallace
A H Oldham
INVENTOR.
John T. Ryan
BY Brown, Critchlow & Flick
his ATTORNEYS.

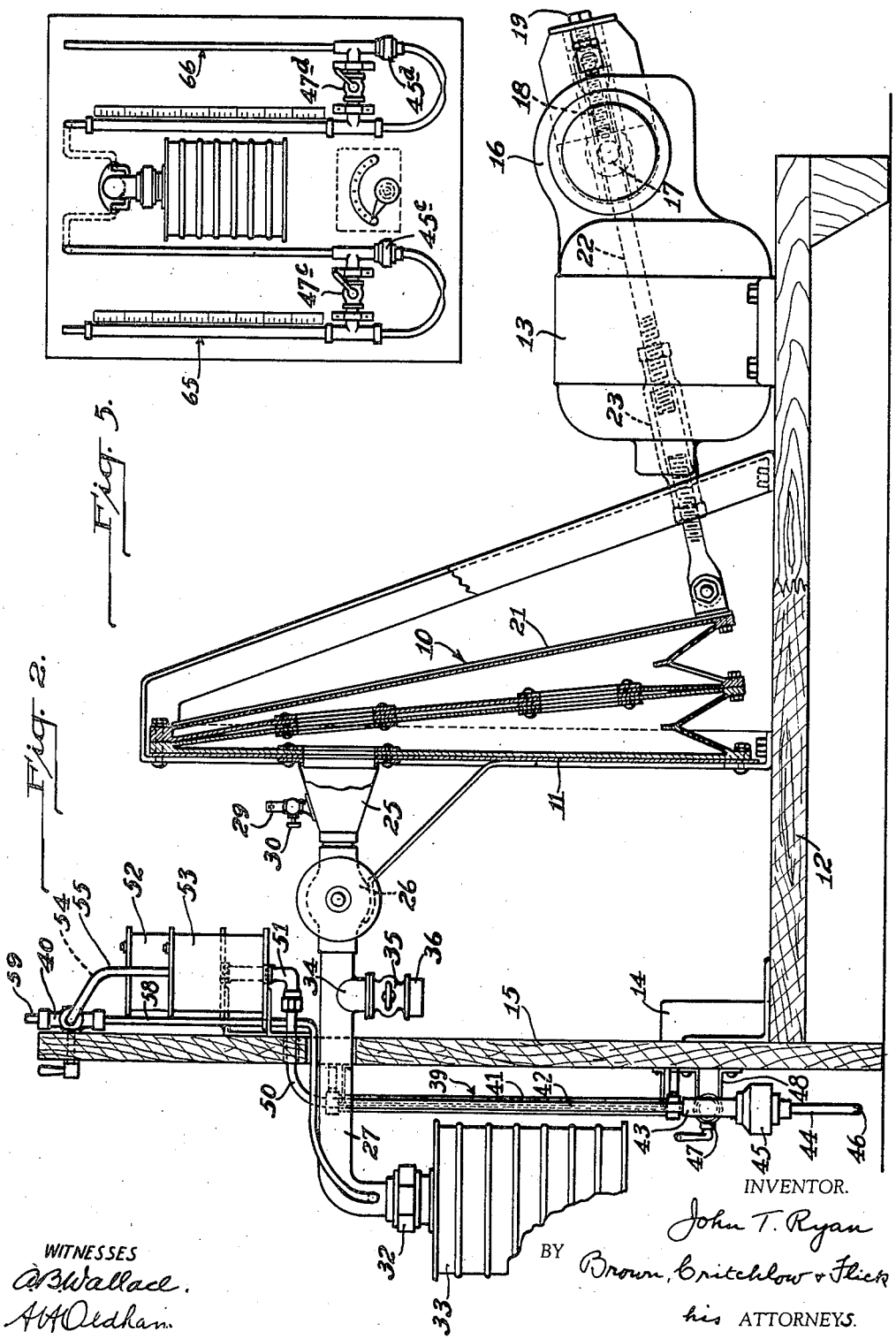

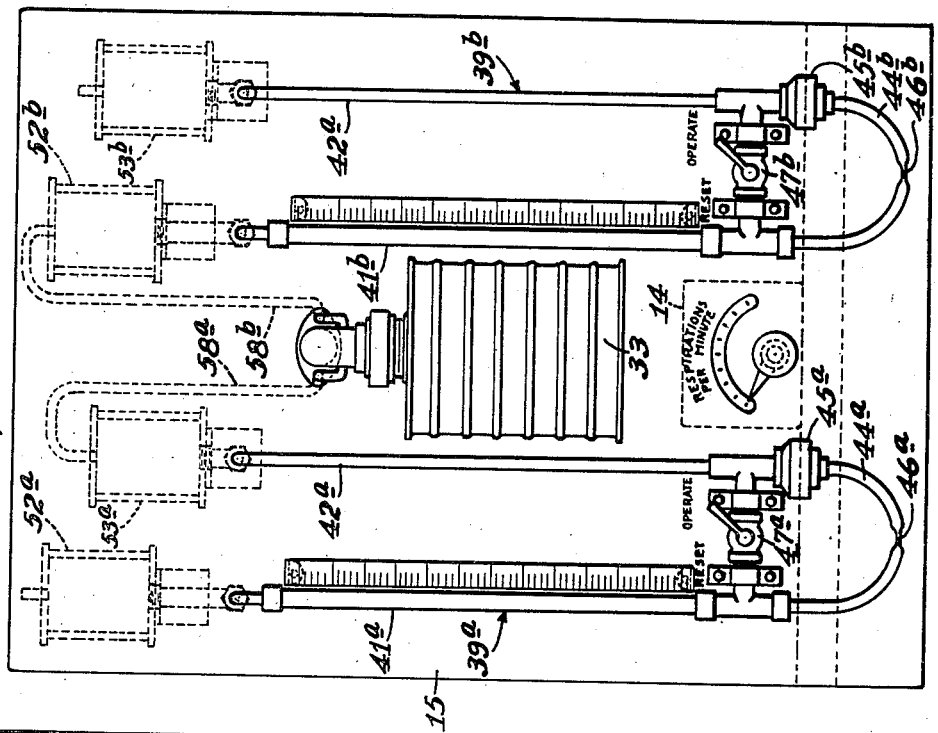

Patented Aug. 10, 1937

2,089,432

UNITED STATES PATENT OFFICE 2,089,432

RESPIRATORY RESISTANCE TESTING MACHINE

John T. Ryan, Pittsburgh, Pa., assignor to Mine Safety Appliances Company, Pittsburgh, Pa., a corporation of Pennsylvania Application September 23, 1935, Serial No. 41,714

15 Claims. (Cl. 73—51)

This invention relates to apparatus for measuring flow resistance of articles to the passage of fluids therethrough, and more particularly is concerned with determining the resistance to breathing of gas mask canisters, self-contained breathing apparatus, and the like.

In the construction of respiratory protective devices, such as gas masks, it is of paramount importance that the resistance to inhalation and exhalation be kept below certain limits so that the user can employ the protective devices without discomfort, fear, and even danger, because of the difficulty of getting enough air to breathe. Accordingly, certain tests have been developed, particularly by the U. S. Bureau of Mines, whereby the resistance to breathing flow in gas masks and the like can be determined, with this resistance being required to be below certain standards established as satisfactory.

However, all prior tests with which I am familiar, as exemplified by the U. S. Bureau of Mines test, measure the flow resistance of a gas mask canister, or the like, by establishing a continuous flow of fluid, ordinarily air, through the device being tested with a measurement of the pressure drop through the device being taken as the indication of the flow resistance. I have found, however, that the continuous flow methods of measuring flow resistance do not provide a true indication of the flow resistance in devices having valves which during normal respiratory inhalation and exhalation open and close periodically. This is because in the continuous flow test the force required to operate the valves is not taken into account. I have found, for example, that with certain types of canisters tested on continuous flow apparatus the apparent resistance to flow is relatively low and well within the required limits. However, when these same canisters are employed in actual use as part of a gas mask assembly the valve action therein increases such apparent resistance as measured by the aforesaid present standard test.

It is accordingly an object of the present invention to avoid and overcome the difficulties attending prior known methods and apparatus for testing flow resistance in respiratory beathing equipment by the provision of an improved apparatus for measuring the flow resistance of gas masks and the like while subjecting them to alternate suction and pressure fluid flow substantially as occurs in normal breathing.

Another object of the invention is to provide respiratory resistance testing apparatus whereby in alternate exhalations and inhalations are provided with means for measuring the flow resistance on both the suction and pressure strokes.

Another object of the invention is to provide measuring mechanism on respiratory resistance testing apparatus which indicates the highest degree of resistance to outward flow and the highest degree of resistance to inward flow through the breathing device tested.

Another object of the invention is the provision of apparatus for accurately determining the resistance of devices to flow of the character to which they are subjected in use.

The foregoing and other objects of the invention are achieved by the provision and apparatus including a bellows, means for operating the bellows to provide an alternate suction and pressure stroke, with the bellows being connected to a conduit which is connected to the gas mask canister or other breathing device being tested. Thus, in the alternate suction and pressure strokes of the bellows fluid is exhaled through the breathing device and then inhaled through the same device. The stroke and speed of the motor can be so adjusted that the frequency and amount of the fluid flow through the breathing device is substantially comparable to ordinary breathing taken under several conditions in several tests, as, for example, ordinary breathing of 15 respirations per minute with a flow of approximately 32 liters per minute. Ordinary work requires some 21 respirations per minute and approximately 45 liters of air per minute. Hard work will require approximately 28 respirations per minute with about 55 liters of air per minute being used.

Associated with the conduit are manometers for determining the resistance to flow both on the inhalation stroke and the exhalation stroke. A single manometer is employed in one embodiment of the invention with suitable valves being provided to permit one side of the manometer to be connected to the conduit during the pressure stroke with the other end of the manometer being connected to the conduit during the suction stroke. The manometer is provided with means, in the nature of a one-way valve, which serve to hold the manometer liquid at the highest suction or pressure indicated and which eliminates constant fluctuation of the liquid level in the manometer during the alternate suction and pressure strokes. Again, in a second form of the invention, two manometers, or U-tubes, are employed and both are connected to the conduit so that one indicates flow resistance during the inhalation stroke and one indicates the resistance during the exhalation stroke.

In the operation of my apparatus the breathing device to be tested is subjected to alternate fluid flow in opposite directions substantially of the amount and at a frequency of breathing under one or several conditions as encountered in use. The flow resistance to the inhalation and exhalation flows is measured to thereby determine the resistance of the breathing device as actually encountered by the wearer in use.

In the drawings Fig. 1 is a plan view of one embodiment of the apparatus of the invention; Fig. 2 is a vertical longitudinal sectional view taken on line II—II of Fig. 1; Fig. 3 is a front elevation of the apparatus shown in Fig. 1; Fig. 4 is a front elevation of the apparatus of a modification of the invention having two indicating manometers; and Fig. 5 is a front elevation of another embodiment of the invention employing ordinary manometers.

Referring particularly to Figs. 1 and 2, the testing apparatus of the present invention includes means for providing alternate suction and pressure strokes whereby a determined amount of fluid can be forced through an article to be tested at a desired frequency. In both of the embodiments of the invention illustrated these means include a bellows, indicated generally by the numeral 10, and including a fixed wall 11 mounted upon a suitable base 12. Also carried on the base 12 is a motor 13 whose speed is controlled by a rheostat 14 mounted on a panel 15 which may be appropriately marked to indicate motor speed. The motor 13 is provided with a reduction gear unit 16 carrying a shaft 17 which has an adjustable length crank arm 18 secured thereto. Screw means 19 are provided to adjust the length of the crank arm 18. The crank arm 18 is connected to the movable wall 21 of the bellows by a connecting rod 22 which is made adjustable in length as by the provision of a turnbuckle 23.

Secured to the stationary wall 11 of the bellows 10 is a funnel 25 which is connected to a valve 26 which in turn leads to a conduit 27 which extends through the panel 15. Valve 26 is merely a metering valve whereby the passage from the funnel 25 through the conduit 27 can be adjusted to provide for the character of flow desired and a sudden rush of fluid from or to the bellows 10 on its pressure and suction strokes is avoided. The funnel 25 is preferably provided with a tube 29 having a valve 30 associated therewith so that if desired a manometer may be connected to the tube 29 and the valve 30 opened to thereby measure the pressure in the bellows 10 and to assist in setting the valve 26 to obtain the desired metering flow.

The end of the conduit 27 extending through the panel 15 is provided with a coupling 32 which is adapted to be connected to the breathing device to be tested and in the embodiment of the invention illustrated this device comprises a canister 33. The conduit 27 is also provided with a connection 34 carrying a closure valve 35 and a one-way valve 36. When it is desired to subject the breathing device to be tested to both suction and pressure strokes the valve 35 is closed but this valve is opened to allow the one-way valve 36 to operate when the article tested is only tested on the suction or pressure, i. e., inhaling or exhaling strokes of the bellows. In this operation, for example, the valve 36 is automatically closed during the suction period but opens during the pressure stroke to permit escape of the fluid in the conduit so that it is not forced through the article tested.

The mechanism for measuring the flow resistance in the breathing device comprises one or more manometers, or U-tubes, which are connected to the conduit 27 and supported on the panel 15. In the embodiment of the invention illustrated in Fig. 3 a single manometer 39 is employed with a two-way valve 40 being provided whereby the manometer can be connected either to show suction or pressure. In this manner the manometer is first employed to determine the suction and thereafter the valve 40 is thrown and a pressure reading taken.

More particularly, the manometer illustrated includes a glass tube 41 and a metal tube 42 which are connected at their lower ends to T's 43 which are in turn connected to a U-shaped tube 44. One or more scales are associated with the manometer tubes as illustrated to facilitate reading of the manometer. A one-way valve 45 is provided between the U-shaped tube 44 and the T 43 secured to the tube 42. The U-shaped tube 44 is preferably formed at its lowest portion with a restricted passage or orifice 46, whereby flow and surging of the liquid in the tube is reduced to render the readings of the manometer more accurate.

The two T's 43 are secured to a by-pass valve 47 held on the panel 15 by clips 48 which thereby serve to support the manometer tubes. The valve 47 is normally closed so that the tubes 41 and 42 connected at their lower ends by the U-shaped tube 44 function as a manometer. However, the valve 47 is adapted to be opened to provide a by-pass return between the tubes 41 and 42 of the manometer to allow the liquid therein to return to zero position, as hereafter more fully described. The panel 15 may be marked "Reset" and "Operate" or other appropriate designations to indicate the position of the valve 47.

The upper end of the tube 41 is connected to an L 50 which extends through the panel 15 and the tube 42 is bent to extend through the panel also. The L 50 and the extension of the tube 42 are connected to couplings 51 secured in the bottom of reservoirs 52 and 53, which contain the liquid reserves of the measuring liquid in the manometer. The upper sides of the reservoirs 52 and 53 are connected by tubes 54 and 55 to the two-way valve 40 which is connected by a tube 58 to the conduit 27 near the coupling 32. The other side of the valve 40 has a short tube 59 open to the atmosphere. The valve 40 when in one position connects the manometer to record sub-atmospheric pressures and with the valve in the other position the manometer indicates super-atmospheric pressures. The panel 15 may be appropriately marked as shown in Fig. 3 to indicate the position of the valve 40.

Since the resistance to flow both on the inhalation and exhalation strokes of most breathing devices is relatively low it is advisable to employ manometers of the differentiating type, that is, having non-miscible liquids of different specific gravities in the legs of the manometer whereby a magnifying action is obtained. This principle in manometer construction is well understood and forms no part of the present invention. These differential manometers are very sensitive and accurate and give an excellent indication of the pressure conditions and the flow resistance of the breathing devices.

Of course the invention contemplates employing other measuring devices than magnifying or differentiating manometers as above described. Various instruments for measuring pressure variations can be employed, for example, as illustrated in Fig. 5 ordinary manometers or U-tubes 65 and 66 can be used. The manometers 65 and 66 are provided with by-pass valves 47c and 47d, similar to the valves 47, 47a and 47b, and one-way valves 45c and 45d similar to valves 45, 45a and 45b. The manometers 65 and 66 are connected into the testing system exactly the same way as the differentiating manometers above described except that reservoirs 52a, 52b, 53a and 53b are generally not used. Either one or two of the ordinary manometers are employed. Two are seen in Fig. 5 with the connections to the testing system being as illustrated. When only one ordinary manometer is used it is merely substituted for the differentiating manometer of Fig. 3 with the connections being the same except the reservoirs 52 and 53 are usually eliminated. The operation of the apparatus is the same with ordinary manometers as with differentiating. The only difference is that the change in height of the fluid in the manometer legs is correspondingly less in the ordinary manometers due to the absence of a magnifying action. Thus with relatively low pressure changes the differentiating manometer more visibly measures these changes.

In the operation of the apparatus just described, a canister 33, or other article to be tested, is connected to the conduit 27 by coupling 32 and with the valves 30 and 35 closed the motor 13 is started. The rheostat 14 is adjusted so that the number of respirations or alterations of the bellows is substantially 15 per minute, comparable, of course, to ordinary breathing of a man while at rest. The length of the crank arm 18 and the length of the connecting rod 22 are adjusted so that the stroke of the bellows is such as to establish a flow through the canister both on the suction, or inhalation stroke, and on the pressure, or exhalation stroke of substantially 32 liters of air per minute.

Assuming that the resistance to inhalation is to be tested first, the two-way valve 40 of the manometer is thrown to the sub-atmospheric or suction side as shown on the panel, so that suction is provided on the tube 55, reservoir 53, and tube 42 of the manometer. This causes the level of the liquid in the tube 42 to rise due to the sub-atmospheric pressure thereon, and because the other side of the manometer is connected to the atmosphere through valve 40 and tube 59. The liquid in the manometer flows by the orifice 46 and the one-way valve 45 during the alternate suction strokes of the bellows 10, but during the pressure strokes when the liquid in the manometer would normally move in the other direction, the one-way valve 45 holds it in the highest position it attained during the suction strokes.

The motor is operated for several minutes with the manometer parts as described and until the several adjustments have been made and a reading taken from the manometer tube 41 as to the resistance to inhalation fluid flow in the canister. The motor 13 is then stopped, and the by-pass valve 47 is moved to the open position which permits the flow of liquid from the tube 42 to the tube 41 of the manometer around the one-way valve 45 and thus to its original zero or no pressure position.

Then valve 40 is now moved to connect tube 54, reservoir 52 and tube 41 with the conduit 27 and to connect the other side of the manometer including tube 42, reservoir 53 and tube 55 to the atmosphere through tube 59. Valve 47 is turned also to the operating or closed position and the motor 13 is started to alternately move air out through the canister 33 and to pull it in through the canister. However, during the pressure stroke of the bellows the pressure in the conduit 27 is carried to the reservoir 52 to force the level of the liquid in tube 41 down and to raise the level of the liquid in tube 42 with the liquid flowing through the one-way valve 45 and through the orifice 46. On the suction stroke the one-way valve 45 prevents fluctuation of the level of the liquid in the tube 42. The motor 13 is run for a short time to give opportunity for the liquid in tube 42 to come to the maximum level and under the required operating conditions. At this time the liquid level in the manometer tube 41 is read to measure the resistance to exhalation flow through the canister 33. The tests are ordinarily repeated with the crank arm 18, connecting rod 22 and rheostat 14 adjusted to provide 21 respirations and 45 liters of flow per minute, and then to provide 28 respirations and 55 liters of flow per minute. Of course the apparatus can be readily adjusted to provide any desired test within wide ranges and the specific examples given are merely by way of illustration.

If it is desired to measure only the resistance to inhalation of a breathing device, where, for example, the exhalation is through a separate valve, the valve 35 is opened at the start of the test. The valve 40 is turned to connect the manometer to measure suction and the apparatus is operated as above described to obtain the resistance to inhalation of the article tested. During the inhalation stroke of the bellows 10 the one-way valve 36 closes so that fluid is drawn through the article tested. However on the exhalation stroke the valve 36 opens to allow escape of the fluid from the conduit 27. By substituting for the valve 36 a valve which permits one-way flow in the other direction, the pressure in the system may be tested, if the valve 40 is turned to connect the manometer to measure pressure. Separate tests at different respirations per minute and amounts of air flow per minute may be conducted on the apparatus functioning as just described, as will be understood.

While the invention has been described in conjunction with a single manometer it will be recognized, as shown in Fig. 4, that two manometers may be employed simultaneously for concurrently measuring the resistance to inhalation and exhalation fluid flow through the breathing device. When two manometers are employed they are quite similar to the one described in detail above and hence their parts have been indicated by identical numerals but with the exponents "a" and "b". The valve 40 is dispensed with and the manometer 39a is continuously connected to the conduit 27 by a tube 59a to indicate suction, and the manometer 39b is connected by a tube 58b so as to indicate pressure. The one-way valves 45a and 45b in the manometers operate to hold the indicating liquid in the manometers steady regardless of the alternate suction and pressure flow established in the conduit 27 and the article tested by the bellows 10. The operation of the apparatus shown in Fig. 4 is quite similar to that illustrated in Fig. 3 and described above with the exception that the valve 40 is eliminated when two manometers are used to indicate concurrently the exhalation and inhalation flow resistance.

From the foregoing description it will be seen that the objects of the invention have been achieved, and that apparatus for testing gas mask canisters, and the like under true operating conditions have been provided. The real flow resistance of the breathing devices to both inhalation and exhalation is readily determinable and tests may be conducted at various alternating flow frequencies and amounts.

Reference is made in the specification and claims to "fluid" flow. Ordinarily the fluid is air but the invention contemplates operating under actual conditions with the flow resistance of breathing devices to fluid flow of a gas or gas-air mixture being tested.

While in accordance with the patent statutes several embodiments of the invention have been illustrated and described in detail, it should be understood that the invention is not limited thereto or thereby but is defined in the appended claims.

I claim:

1. Testing apparatus for measuring the resistance to the inflow and outflow of fluid through a breathing apparatus element, such as a gas mask canister or the like, comprising a bellows, a controllable speed driving means for operating the bellows, a crank associated with said driving means, an adjustable-length connecting rod pivotally secured to the movable portion of the bellows and adjustably secured to the crank for adjusting the stroke of the bellows, a conduit extending from the bellows for connection to said element to alternately draw fluid into and expel it from said element, an adjustable valve in the conduit for controlling the rate of air flow through the conduit, a pair of tubes extending from the conduit adjacent said element, a suction-measuring manometer connected to one tube and a pressure-measuring manometer connected to the other of said tubes, each of said manometers including a surge-preventing orifice and a one-way valve in the pressure-measuring liquid whereby the manometers show respectively the highest suction and pressures to which they are subjected without substantial fluctuation due to the alternating suction and pressure in the conduit, and a valved by-pass connecting the legs of each manometer for resetting the zero level of the liquid in each after test.

2. Testing apparatus for measuring the resistance to the inflow and outflow of air through a breathing apparatus element, such as a gas mask or the like, comprising a bellows, a controllable speed driving means for operating the bellows, a conduit extending from the bellows for connection to said element to alternately draw air into and expel it from said element, a pair of tubes extending from the conduit, a suction-measuring manometer connected to one tube and a pressure-measuring manometer connected to the other of said tubes, each of said manometers including a one-way valve whereby the manometers show respectively the highest suction and pressures to which they are subjected without substantial fluctuation due to the alternating suction and pressure in the conduit, and a valved by-pass connecting the legs of each manometer for resetting the zero level of the liquid in each after test.

3. Testing apparatus for measuring the resistance to the inflow and outflow of gas through a breathing apparatus element, such as a canister or the like, comprising a bellows, means for operating the bellows, means for connecting the element to the bellows to alternately draw gas into and expel it from said element, a pair of tubes extending from the bellows, and a suction-measuring manometer connected to one tube and a pressure-measuring manometer connected to the other of said tubes, each of said manometers including a one-way valve whereby the manometers show respectively the highest suction and pressures to which they are subjected without undesirable fluctuation due to the alternating suction and pressure of the bellows.

4. Testing apparatus for measuring the resistance to the inflow and outflow of air through a breathing apparatus element, such as a gas mask or the like, comprising a bellows, a controllable speed means for operating the bellows, a conduit extending from the bellows for connection to said element to alternately draw air into and expel it from the element, a pair of tubes extending from the conduit, and a suction-measuring manometer connected to one tube and a pressure-measuring manometer connected to the other of said tubes.

5. Testing apparatus for measuring the resistance to the inflow and outflow of air through a breathing apparatus element, such as a gas mask or the like, comprising a bellows, means for operating the bellows, a conduit extending from the bellows for connection to said element to alternately draw air in through the element in one direction and expel it through the element in the other and means for indicating the pressure in the conduit during test.

6. Testing apparatus for measuring the resistance to the inflow and outflow of fluid through a breathing device comprising means for providing alternating super- and sub-atmospheric pressures and substantially simulating breathing quantities and frequencies, a coupling secured to said means and conveying said breathing quantities and pressures to and through the breathing device, a suction-measuring manometer and a pressure-measuring manometer connected in the system, each of said manometers including a one-way valve whereby the manometers show respectively the highest suction and pressures to which they are subjected without material fluctuation due to the alternating suction and pressure in the conduit and a valved by-pass connecting the legs of each manometer for resetting the zero level of the liquid in each after test.

7. Testing apparatus for measuring the resistance to the inflow and outflow of air through a breathing apparatus element, such as a gas mask or the like comprising means for providing alternating super- and sub-atmospheric pressures and substantially simulating breathing quantities and frequencies, a conduit secured to said means and conveying said breathing quantities and pressures to and through the element, a pair of tubes extending from the conduit, and a suction-measuring manometer connected to one tube and a pressure-measuring manometer connected to the other of said tubes, each of said manometers including a one-way valve whereby the manometers show respectively the highest suction and pressures to which they are subjected without prejudicial fluctuation due to the alternating suction and pressure in the conduit.

8. The combination in apparatus for testing breathing devices of means for applying alternate suction and pressure on the gas to be passed through a breathing device, means for connecting a breathing device to the last-named means, a conduit including a closure valve and a one-way valve opening to the atmosphere associated with the combination whereby the gas may be selectively caused to move through the breathing device in only one direction, and means for measuring the pressure drop of the gas flowing through the breathing device.

9. A respiratory testing machine for determining the flow resistance of breathing device including means connected to a device for alternating moving fluid through the device in one direction and then in the other, means for adjusting the frequency of the alternations of the fluid flow, and means in said connection for measuring the flow resistance to movement of fluid in one direction and in the other direction.

10. A respiratory testing machine for determining the flow resistance of breathing apparatus elements, such as canisters and the like including means connected to an element for alternating moving fluid through the element in one direction and then in the other, and means in the connection for measuring the flow resistance to movement of fluid in either direction through the canister.

11. Mechanism for determining the resistance to fluid flow of articles comprising a conduit adapted to be connected with the article to be tested, means associated with the conduit for supplying known amounts of fluid through the article and a U-tube having both legs connected to a two-way valve at their upper ends and the valve connected to the conduit whereby either leg of the tube can be connected to the conduit and the other leg to the atmosphere by throwing the valve, a one-way valve in the liquid-carrying portion of the tube, a by-pass between the legs of the tube above the one-way valve, and a valve normally closing the by-pass but adapted to be opened to reset the manometer after testing.

12. Mechanism for determining the resistance to fluid flow of articles comprising a conduit adapted to be connected with the article to be tested, means associated with the conduit for supplying fluid through the article and a U-tube connected to the conduit, a one-way valve in the liquid-carrying portion of the tube, a by-pass between the legs of the tube above the one-way valve, and a valve normally closing the by-pass but adapted to be opened to reset the manometer after testing.

13. Apparatus for determining the resistance to inhalations and exhalations of breathing apparatus elements, such as gas masks and the like, comprising a conduit connected to an element, a bellows connected to the conduit and adapted to alternately inhale air in through and exhale air out through the element, a motor for driving the bellows, a rheostat for controlling the speed of the motor, an adjustable-length crank arm on the motor, an adjustable-length connecting rod connecting the movable side of the bellows and the crank arm, said adjustable crank arm and connecting rod making the bellows stroke adjustable, and means associated with the conduit for measuring the inhaling and exhaling flow resistance of the element.

14. Apparatus for determining the resistance to inhalations and exhalations of breathing devices, comprising a bellow adapted to alternately inhale air in through and exhale air out through the device, a motor for driving the bellows, an adjustable-length crank arm associated with the motor, and a connecting rod connecting the movable side of the bellows and the crank arm, said adjustable crank arm making the bellows stroke adjustable, and means for measuring the inhaling and exhaling flow resistance of the gas mask.

15. Testing apparatus for measuring the resistance to the inflow and outflow of fluid through a breathing device, such as a gas mask or the like, comprising means for moving fluid through the device in either direction, a conduit connecting the means to the device, and manometer means for indicating the pressure in the conduit during test, said manometer including mechanism for maintaining the liquid level in the highest position to which it moves during the test.

JOHN T. RYAN.